United States Patent Office 3,514,229
Patented May 26, 1970

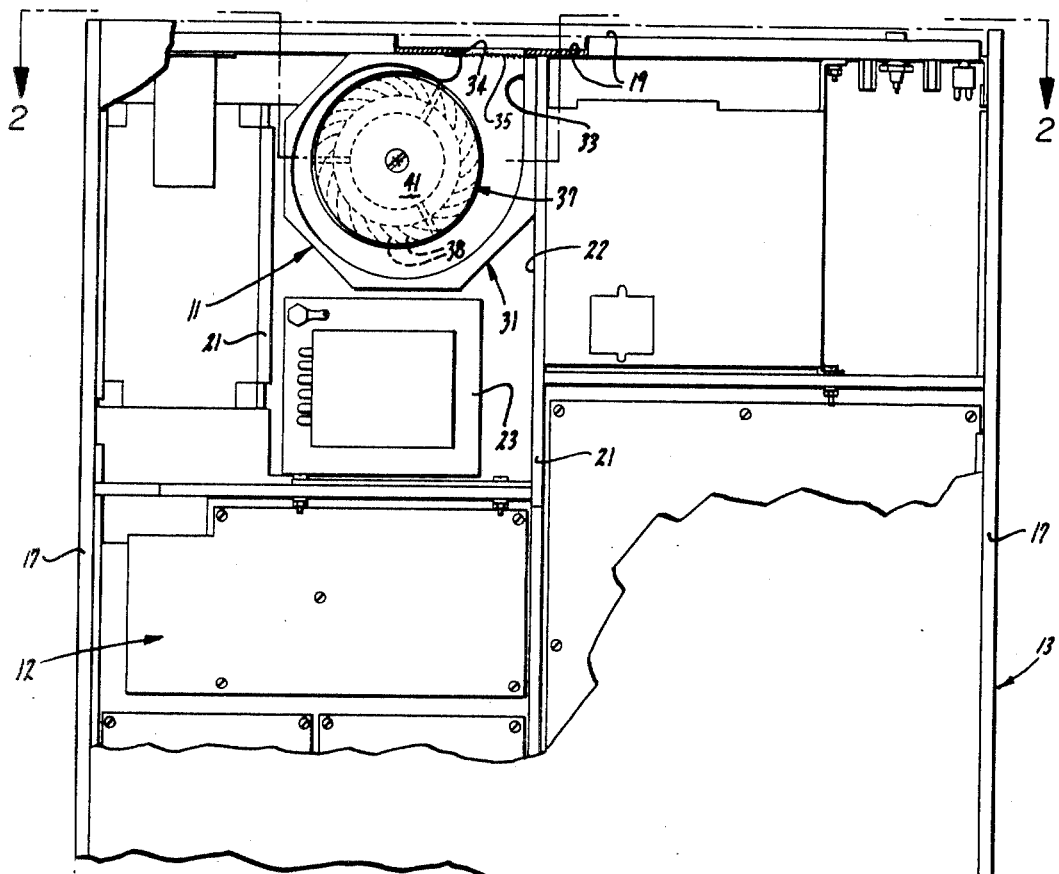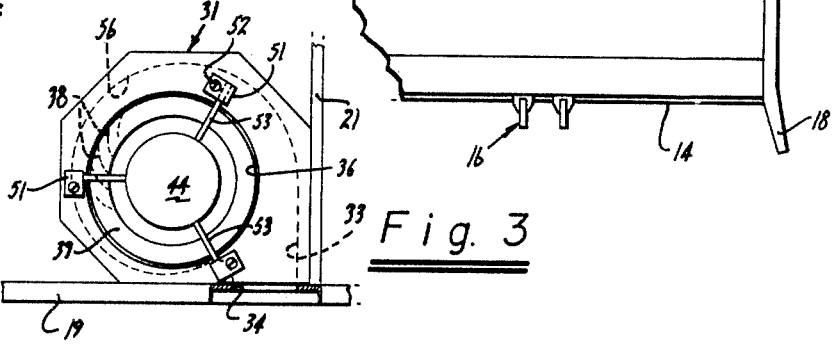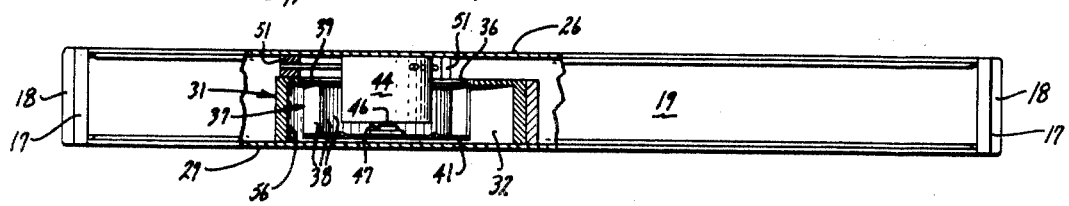

3,514,229
BLOWER ASSEMBLY FOR ELECTRONIC INSTRUMENT
Donald V. Walker, Concord, and Harrison Doyle, Oakland, Calif., assignors to Systron-Donner Corporation, Concord, Calif., a corporation of California
Filed Mar. 1, 1968, Ser. No. 709,633
Int. Cl. F04b 39/00; F04d 25/06
U.S. Cl. 417—424                         9 Claims

ABSTRACT OF THE DISCLOSURE

Blower assembly for electronic instrument having a squirrel-cage blower mounted in a housing with the motor for driving the blower being disposed in the opening in one end of the blower and having an output shaft with means mounted on the other end of the blower for mounting the same on the output shaft so that the motor is disposed on an axis concentric with the axis of rotation of the blower.

BACKGROUND OF THE INVENTION

In electronic instruments, it is often necessary to provide additional cooling for the instruments. This cooling is conventionally obtained by the provision of a fan or a blower within the electronic instrument. In the development of an electronic instrument of the type disclosed in copending application Ser. No. 709,637, filed Mar. 1, 1968, it was found that blowers which were conventionally available with sufficient capacity had dimensions which were unsuitable for incorporation in such an electronic instrument. In particular, it was found that there were no blowers available which could operate within the 1¼ inch height and which were suitable for the purpose. There is, therefore, a need for a new and improved blower assembly for electronic instruments of this type.

SUMMARY OF THE INVENTION AND OBJECTS

The blower assembly consists of a cylindrical squirrel-cage blower which has an opening at one end. A motor is provided which has an output shaft. Means is provided on the other end of the blower for mounting the blower on the shaft so that the motor extends into the opening in the blower and has its axis concentric with the axis of rotation for the blower. A housing is provided for the blower to enhance the movement of air by the blower.

In general, it is an object of the present invention to provide a blower which has at least one dimension which is relatively small so that the same can be incorporated in electronic instruments having very little height.

Another object of the invention is to provide a blower assembly of the above character which can be readily incorporated in electronic instruments.

Another object of the invention is to provide a blower assembly of the above character which is relatively efficient.

Additional objects and features of the invention will appear from the following description in which the preferred embodiment is set forth in conjunction with the accompanying drawing.

BRIEF DESCRIPTION OF THE DRAWING

FIG. 1 is a bottom plan view of an electronic instrument with certain parts broken away and showing the construction of the blower assembly incorporating the present invention.

FIG. 2 is a rear elevational view taken along the line 2—2 of FIG. 1.

FIG. 3 is a partial plan view of the blower assembly in the electronic instrument shown in FIG. 1 with the top cover plate removed.

DESCRIPTION OF THE PREFERRED EMBODIMENT

The blower assembly 11 incorporating the present invention is mounted in an electronic instrument 12. The electronic instrument 12 is provided with a case 13 which has very little height as, for example, a height of 1¾ inches. The case 13 is provided with a front panel 14 which has controls 16 mounted thereon. The case also includes spaced parallel side frame mebers 17 secured to the front panel 14 and which are provided with handles 18. The case or cabinet 13 also includes a rear frame member 19 which is secured to the side frame member 17 in such a manner that the side frame member 17 with the rear frame member 19 and the front panel 14 provide a rectangular framework. Additional frame members 21 are provided within the framework formed by the side frame members 17 and the rear frame member 19 and the front panel 14.

The blower assembly 11 is disposed within a compartment 22 formed by certain of the frame members 21 in combination with the rear frame member 19. The transformer 23 which forms part of the electronic instrument is also mounted within the compartment 22. The case 13 is also provided with a removable top cover plate 26 and a removable bottom cover plate 27. The cover plates 26 and 27 in combination with the rear frame member 19, the front panel 14 and the side frame member 17 form an enclosure. Many other electronic components (not shown) are mounted within the case 13 but do not form a part of the present invention and thus will not be described in detail.

The blower assembly 11 consists of a blower housing 31 formed of suitable material such as an aluminum casting. The blower housing is provided with a large recess 32 within the same and which opens into a discharge opening 33 that is in communication with an opening 34 provided in the rear frame member 19. The opening 34 is covered by a screen 35. The blower housing 31 is mounted in the compartment 22 so that its open side is substantially flush with the bottom cover plate 27 as shown in FIG. 2. A circular opening 36 is provided in the other side of the blower housing 31 and is in communication with the recess 32. It is offset to one side of the blower housing as can be seen in FIG. 3. A cylindrical squirrel-cage blower 37 is disposed within the recess 32 in alignment with the opening 36. The blower 37 is provided with a plurality of curved vanes 38 which are affixed to a top annular member 39 and a bottom disc 41 near the outer margins of the same so that the vanes are arranged around a circle. Means is provided for mounting the blower 37 within the blower housing 31 and for driving the same and consists of an electric motor 44 which is substantially cylindrical in shape. The motor 44 extends through the opening 36 and into the blower 37. The motor 44 is provided with an output shaft 46. Means is provided for connecting the disc 41 of the blower 37 to the output shaft and consists of a coupling 47. The motor 37 is mounted so that its axis is coincident with the axis of rotation for the blower 37. Means is provided for supporting the motor and consists of three blocks 51 which are secured to the blower housing 31 by screws 52. Rods 53 mounted in the motor 44 extend radially therefrom and are mounted in the blocks 51 to provide a three-point mounting for the motor.

The blocks 51 are of such a size so that their upper surfaces are parallel with the inner surface of the top cover plate 26 and serve to support the top cover plate.

It can also be noted that the top side of the motor 44 is flush with the inner surface of the top cover plate 26. The blower 37 is mounted upon the motor 44 in such a manner that the disc 41 just clears the inner surface of the bottom cover plate 27. The blocks 51 serve to prevent any force which is applied to the top cover plate from shifting the motor 44 downwardly to cause the blower to engage the lower cover plate. The diameter of the motor 44 is substantially less than the diameter of the opening 36 so that air can travel into the opening 36.

The blower 37, in cooperation with the blower housing 31, provides a scroll-like or volute type passage 56 which increases exponentially in size towards the discharge opening 33.

Operation of the blower assembly in the electronic instrument may now be briefly described as follows. Energization of the motor 44 causes the blower to rotate in a counter-clockwise direction as viewed in FIG. 1 to cause air to be discharged outwardly through the discharge opening 33. The blower assembly 11 and the case 13 are constructed in such a manner that there is a relatively free flow of air through the case and over the electronic components to cool the same and into the squirrel-cage blower where it is directed through the scroll-like passage 56 and out the discharge opening 44. The blocks 51 and the rods 53 which are provided for the motor 44 do not obstruct the free flow of air from the interior of the case into squirrel-cage blower 37.

The construction of the blower assembly is such that it requires very little space in a vertical dimension as can be seen particularly in FIG. 2, while at the same time providing a relatively efficient blower which can be utilized for removing large quantities of air from within the case 13. The construction is also such that even though there is relatively little space provided between the bottom cover plate 27 and the lower extremity of the blower 37, the blocks 51 prevent the top cover from moving the motor 44 downwardly and causing the blower 37 to engage the cover plate 27.

We claim:

1. In a blower assembly adapted for cooling electronic instruments having closely spaced top and bottom cover plates, a cylindrical squirrel-cage blower having a substantially flat and imperforate circular plate at one end and an opening in the other end thereof, a motor having an output shaft, means secured to the inner surface of said flat plate and to the output shaft of the motor so that the motor is disposed within the opening in said blower and has its longitudinal axis concentric with the axis of rotation of the blower, a blower housing and means mounting said motor on said blower housing so that said blower is disposed in said blower housing.

2. A blower assembly as in claim 1 wherein said blower and said housing form a scroll-like passage in the same.

3. A blower assembly as in claim 1 wherein said means for mounting said motor on said blower housing includes a plurality of spaced blocks and means for supporting said motor from said blocks, said blocks being adapted for engaging the inner surface of the top cover plate to provide support for said cover plate.

4. A blower assembly as in claim 1 wherein said blower housing is provided with an opening in one side thereof and in which said blower is mounted in said opening in said blower housing, said side being adapted for engaging the bottom cover plate of said electronic instrument in such manner that said bottom cover plate overlies said opening, with the outer surface of said flat circular plate in close proximity to said cover plate.

5. In the combination of a blower assembly and a case for an electronic instrument, said case having spaced parallel front and rear walls and spaced parallel side walls secured to the front and rear walls and top and bottom cover plates, said blower assembly comprising a blower housing mounted within the case, said rear wall having a discharge opening in alignment with the discharge opening in the blower housing, said blower housing having an opening therein, a blower disposed within said blower housing in alignment with said opening, said blower having a substantially flat and imperforate circular plate at one end and an opening in the other end thereof, a motor disposed in said opening in said blower, said motor having an output shaft having an axis of rotation concentric with the axis of rotation for the blower, means carried by the inner surface of said flat plate for mounting said blower on said shaft, and means on said blower housing for supporting said motor.

6. A combination as in claim 5 wherein said means for supporting said motor includes a plurality of blocks mounted on said blower housing, the upper surfaces of said blocks serving to provide a supporting surface for said top plate.

7. A combination as in claim 6 wherein the upper surface of the motor is substantially flush with the inner surface of the top cover plate.

8. A combination as in claim 5 wherein the bottom side of said blower housing is open and wherein said bottom cover plate is generally flush with the bottom surface of the blower housing to enclose the same.

9. A combination as in claim 5 wherein said blower and said blower housing form a scroll-like passage in the same.

References Cited

UNITED STATES PATENTS

| | | | |
|---|---|---|---|
| 2,297,049 | 9/1942 | Cotton et al. | 230—117 |
| 3,401,870 | 9/1968 | Crowe | 230—117 |

ROBERT M. WALKER, Primary Examiner